H. F. KNAPP.
Means for Raising Sunken Vessels.

No. 147,653.  Patented Feb. 17, 1874.

Witnesses.
John Becker
Fred Haynes

Henry F. Knapp
by his Attorneys
Brown & Allen

UNITED STATES PATENT OFFICE.

HENRY F. KNAPP, OF NEW YORK, N. Y.

IMPROVEMENT IN THE MEANS FOR RAISING SUNKEN VESSELS.

Specification forming part of Letters Patent No. 147,653, dated February 17, 1874; application filed April 25, 1873.

*To all whom it may concern:*

Be it known that I, HENRY F. KNAPP, of the city, county, and State of New York, have invented certain Improvements in Means for Raising Sunken Vessels, of which the following is a specification:

This invention relates to that method or means of raising sunken vessels secured to me by Letters Patent No. 133,863, dated December 10, 1872, in which, a vessel having been anchored near the sunken vessel, a bent pipe connected by a flexible joint with a pump on the vessel above is lowered and manipulated so that its lower end is brought close to or passed under the wreck. Air or water is then forced by the pump through the pipe to clear a passage under the sunken vessel, after which a cork with a light twine attached to it is washed or forced by the pump through the pipe and under the wreck, and, with the twine attached to it, rises to the surface of the water on the opposite side of the wreck. This twine is made the vehicle for the carrying of a stronger cord, and so on until a cord of sufficient strength is passed under the vessel to convey under and bring to the surface a chain-cable.

The present invention more particularly relates to the pipe used to get the chain-cables under the hull of the wreck, as above; and consists in a construction of said pipe throughout its length, or lower portion thereof, with a number of orifices or outlets for escape of a portion of the air or water forced through the pipe, to liquefy or loosen the surrounding mass of sand or matter through which the pipe is required to be projected, and so facilitate the passage of the pipe under the wreck.

Figure 2:
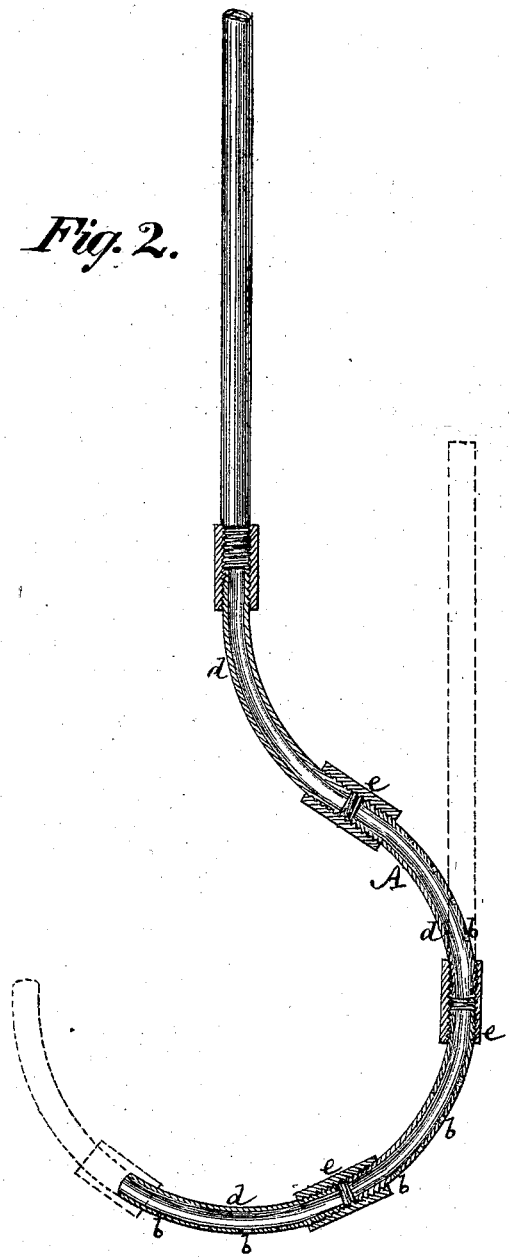
Figure 1:
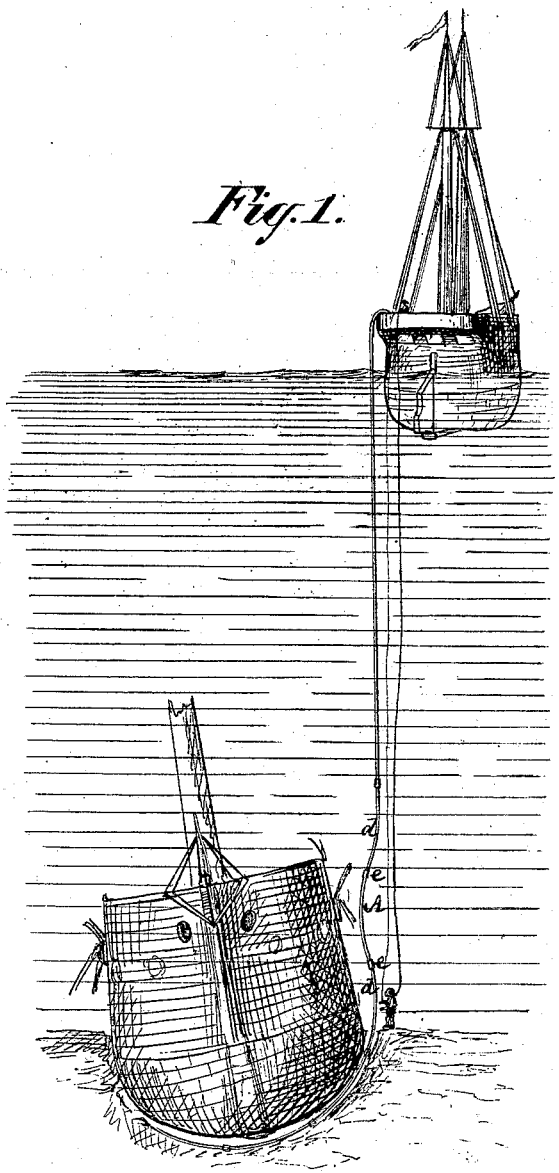

In the accompanying drawing, which forms part of this specification, Figure 1 represents a general view of the pipe, as applied to the wreck; and Fig. 2, a longitudinal sectional view of the pipe on a larger scale, but with quicker bends.

Similar letters of reference indicate corresponding parts.

A represents the pipe, through which a twine or cords are passed, as a preparatory means of passing a chain-cable under the wreck. Said pipe, which is suitably curved, and connected by a flexible attachment with the pump above, is not only left open at its lower end for forcible expulsion of air or water through it, but is also provided throughout its length, or lower portion thereof, with a number of side outlets, *b*, to admit of the escape therethrough of a portion of the air or water being expelled, whereby the surrounding mass of sand or matter is liquefied or loosened, which greatly facilitates the passage of the pipe under the wreck. A valve or valves may, if desired, be applied to regulate or close escape, when required, through these orifices *b*, or they may be separately plugged by screws; or the pipe A may be divided longitudinally by the attachment, along its outer or under side, of a supplementary pipe, having the orifices *b* in it, and having a separate attachment with the pump, to provide for a separate discharge of air or water therethrough, or to shut off such discharge without affecting or stopping the flow through the main pipe; but I have not thought it necessary to illustrate this modification. I also propose, in some cases, to provide the pipe A either with a check-valve at its foot, or with a stop-valve at any suitable point above, to prevent the ingress of sand or mud into the pipe upon the pump being suddenly stopped, or at any other period. Said pipe A, the upper portion of which may either be rigid or composed of a flexible tube, is here represented as constructed of a number of curved sections, *d*, united by screw-couplings *e*. These curved sections may either be manipulated and attached or detached, as required, by a diver from below, or may be manipulated from above by suitably turning the upper one of such curved sections, or each upper curved section in succession, within the screw-coupling connecting it with the adjacent section, whereby the curved pipe as a whole may be manipulated closer to the wreck without straining its flexible connection with the pump or materially varying the line of action, and whereby said pipe is made to more perfectly hug or conform to the hull, and a curved pipe of the required length is more readily passed under the hull. This adjustment or manipulation of the curved sections is illustrated in Fig. 2, which shows in full lines the upper curved section as cranked inward when commencing to project the pipe under the wreck, but which is afterward turned half round or cranked outward to hug the wreck, when the pipe is further projected or passed under the wreck, as shown by dotted lines in said figure. The same pipe A that is used to pass the cord or cords by which the chain-cable is drawn under the wreck may afterward be used alongside of such chain to ease and expedite the run or passage of the chain through the sand or mud of the bed on which the wreck lies.

What is here claimed, and desired to be secured by Letters Patent, is—

In a pipe, A, by which clearance is established under the wreck, as described, the orifices or outlets $b$ at different points in the length of the pipe, substantially as described, for the purpose of facilitating the passage of the pipe under the wreck, by providing for the escape of air or water to soften or liquefy the mass through which said pipe is being projected, as herein set forth.

HENRY F. KNAPP.

Witnesses:
MICHAEL RYAN,
FRED. HAYNES.